United States Patent
Woodward et al.

(10) Patent No.: US 11,736,198 B2
(45) Date of Patent: Aug. 22, 2023

(54) OPTICAL EMITTER, COMMUNICATION SYSTEM AND METHOD

(71) Applicant: Kabushiki Kaisha Toshiba, Tokyo (JP)

(72) Inventors: Robert Ian Woodward, Cambridge (GB); Zhiliang Yuan, Cambridge (GB); Andrew James Shields, Cambridge (GB)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 17/652,555

(22) Filed: Feb. 25, 2022

(65) Prior Publication Data

US 2022/0385371 A1 Dec. 1, 2022

(30) Foreign Application Priority Data

May 28, 2021 (GB) ..................................... 2107708

(51) Int. Cl.
| | |
|---|---|
| *H04B 10/00* | (2013.01) |
| *H04B 10/50* | (2013.01) |
| *H04B 10/70* | (2013.01) |
| *H04J 14/00* | (2006.01) |

(52) U.S. Cl.
CPC ........... *H04B 10/503* (2013.01); *H04B 10/70* (2013.01)

(58) Field of Classification Search
CPC ..................................................... H04B 10/70
See application file for complete search history.

(56) References Cited

U.S. PATENT DOCUMENTS

| | | | |
|---|---|---|---|
| 2005/0047601 A1 | 3/2005 | Shields et al. | |
| 2015/0172048 A1* | 6/2015 | Wabnig | H04L 9/0858 |
| | | | 380/256 |
| 2017/0237505 A1 | 8/2017 | Lucamarini et al. | |
| 2020/0150240 A1* | 5/2020 | Huwer | G01S 7/4863 |
| 2020/0336211 A1 | 10/2020 | Zhang et al. | |

FOREIGN PATENT DOCUMENTS

| | | | | |
|---|---|---|---|---|
| CN | 106254065 B | * | 8/2019 | ........... H01S 5/0657 |
| CN | 106254065 B | | 8/2019 | |
| GB | 2529228 A | | 2/2016 | |
| GB | 2537821 B | | 4/2017 | |
| GB | 2529228 B | | 8/2017 | |

(Continued)

OTHER PUBLICATIONS

Machine Translation of CN 106254065 B to Jiang et al., Clarivate Analytics, 2022, pp. 1-9 (Year: 2022).*

(Continued)

*Primary Examiner* — Daniel G Dobson
(74) *Attorney, Agent, or Firm* — Oblon, McClelland, Maier & Neustadt, L.L.P.

(57) ABSTRACT

An optical emitter comprising a primary laser and a plurality of secondary lasers wherein each secondary laser is optically injection locked to said primary laser, the emitter further comprising at least one polarisation controller configured to control the polarisation of the output of at least one of the secondary lasers,
the emitter further comprising a combination unit that is configured to combine the outputs of the secondary laser modules into an output signal.

23 Claims, 5 Drawing Sheets

(56) References Cited

FOREIGN PATENT DOCUMENTS

| GB | 2573218 A | 10/2019 |
|---|---|---|
| JP | 2016-042694 A | 3/2016 |
| WO | WO 2016/142701 A1 | 9/2016 |

OTHER PUBLICATIONS

British Combined Search and Examination Report dated Nov. 17, 2021 in GB 2107708.6 filed on May 28, 2021, 7 pages.
Yuan et al., "Directly Phase-Modulated Light Source", Physical Reviewx, 6, 031044, 2016, 8 pages.
Gruenenfelder et al., "Performance and security of 5 GHz repetition rate polarization-based quantum key distribution", Applied Physics Letters 117, 144003, 2020, 5 pages.
Nauerth et al., "Information leakage via side channels in freespace BB84 quantum cryptography", New Journal of Physics 11, 065001, 2009, 9 pages.
Vest et al., "Design and Evaluation of a Handheld Quantum Key Distribution Sender module," IEEE Journal of Selected Topics in Quantum Electronics, vol. 21, No. 3, 2015, 7 pages.
Pugh et al., "Airborne demonstration of a quantum key distribution receiver payload," Quantum Science and Technology 2, 024009, 2017, 11 pages.
Pugh et al., "Airborne demonstration of a quantum key distribution receiver payload", arXiv:1612.06396v2, 2017, 16 pages.
Combined United Kingdom Office Action and Search Report dated May 2, 2022 in United Kingdom Patent Application No. 2107712.8, 11 pages.
Japanese Office Action dated Jun. 6, 2023, issued in Japanese Patent Application No. 2022-044921 (with English translation).

\* cited by examiner

OPTICAL EMITTER, COMMUNICATION SYSTEM AND METHOD

FIELD

Embodiments described herein relate to an optical emitter, communication system and method.

BACKGROUND

In a quantum communication system, information is sent between a transmitter and a receiver by encoded single quanta, such as single photons. Each photon carries one bit of information which can be encoded upon a property of the photon, such as its polarization.

Quantum key distribution (QKD) is a technique which results in the sharing of cryptographic keys between two parties: a transmitter often referred to as "Alice"; and a receiver often referred to as "Bob". The attraction of this technique is that it provides a test of whether any part of the key can be known to an unauthorised eavesdropper, often referred to as "Eve". In many forms of quantum key distribution, Alice and Bob use two or more non-orthogonal bases in which to encode the bit values. The laws of quantum mechanics dictate that measurement of the photons by Eve without prior knowledge of the encoding basis of each causes an unavoidable change to the state of some of the photons. These changes to the states of the photons will cause errors in the bit values sent between Alice and Bob. By comparing a part of their common bit string, Alice and Bob can thus determine if Eve has gained information.

DETAILED DESCRIPTION OF THE FIGURES

Figure 1:
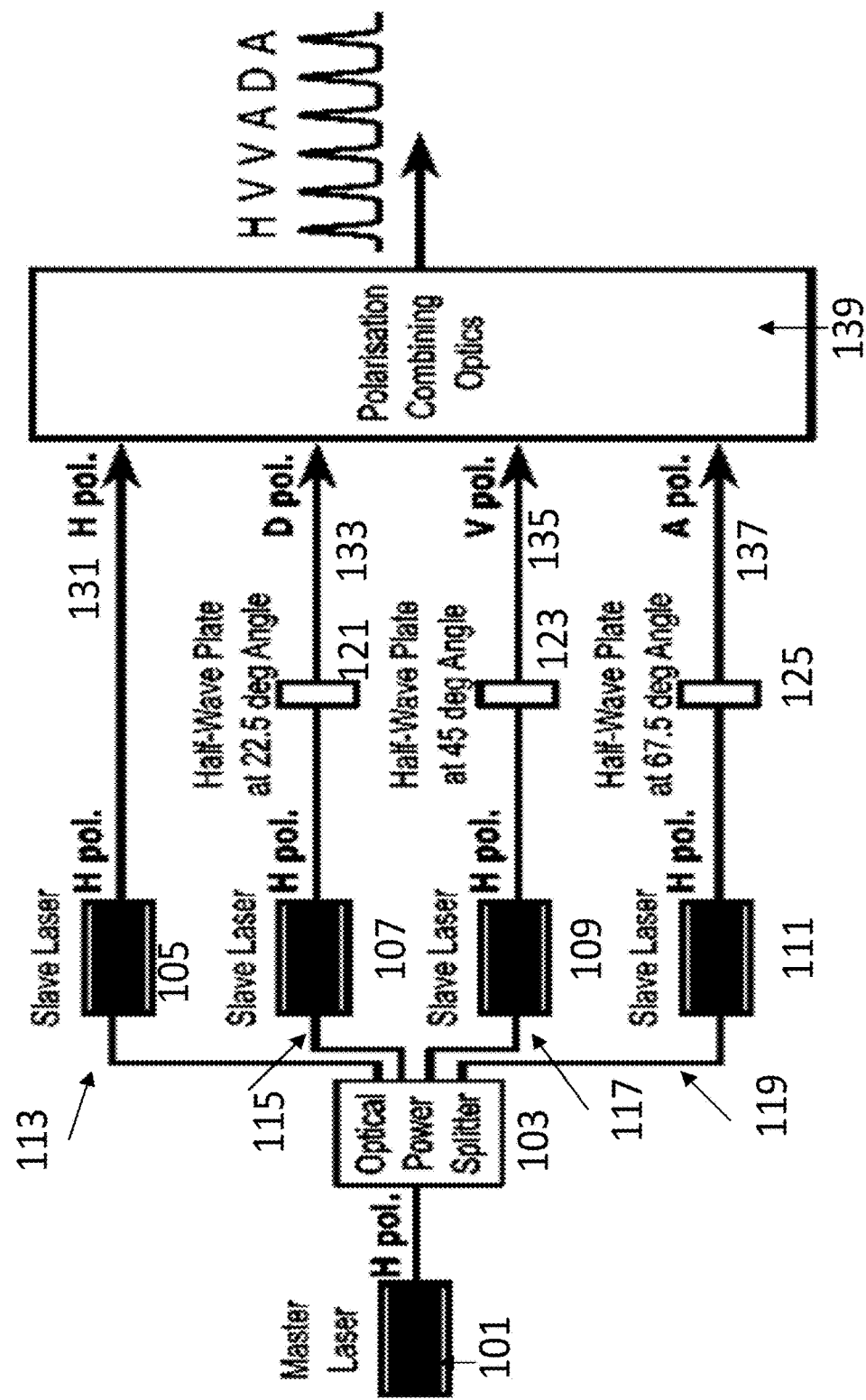
FIG. 1 is a schematic of an emitter in accordance with an embodiment.

In an embodiment, an optical emitter is provided comprising a primary laser and a plurality of secondary lasers wherein each secondary laser is optically injection locked to said primary laser, the emitter further comprising at least one polarisation controller configured to control the polarisation of the output of at least one of the secondary lasers, the emitter further comprising a combination unit that is configured to combine the outputs of the secondary laser modules into an output signal.

The above arrangement uses optical injection locking where an array of secondary laser (which are sometimes termed 'slave lasers', following standard nomenclature) are seeded and thus, injection locked by light from a common primary laser (which are sometimes termed the 'master laser' following standard nomenclature). By optically injection locking each of the secondary lasers with the same primary laser, each secondary laser outputs radiation with an identical wavelength. Therefore, it is not possible to distinguish between the outputs of the secondary lasers due to slight variations in their wavelengths. In quantum communication, pulses of radiation are prepared and are encoded with different polarisations. In the above arrangement, each secondary laser can be used in the production of pulses with one polarisation. If the output of the secondary lasers is identical except for the polarisation, it is not possible to obtain information about the polarisation from the variations in the wavelength of the laser.

If the array of secondary lasers were operated without optical injection locking with a primary laser, there would unacceptable side-channel information leakage due to the slight variations between the laser outputs. Without optical injection locking each laser operates independently and any slight variations in the component (e.g. material property or geometry variations) can lead to measurable differences in laser properties (e.g. wavelength). Further, temporal jitter, which arises from the nature of pulses being seeded by random spontaneous emission, can induce timing errors for high-clock speed systems if the secondary lasers are not injection locked.

In an embodiment, the primary laser and the secondary lasers are pulsed lasers.

In a further embodiment, the emitter further comprises a selection unit configured to select one of said plurality of secondary lasers to contribute to the output signal at a time such that the output signal comprises a sequence of pulses wherein the sequence randomly switches between the outputs of the secondary lasers such that the polarisation of the pulses change for each pulse.

In an embodiment, the primary laser and the plurality of secondary lasers are gain-switched lasers. Further, the primary laser may be controlled to emit pulses with a random phase between the pulses.

For example, the selection unit may be configured to select one of said plurality of secondary lasers by activating one of said secondary lasers. Activating a secondary laser comprises applying a gain to the laser above its lasing threshold. The selection unit may also be configured to apply a gain to hold the non-selected lasers below their lasing threshold.

The optical emitter may comprise an optical power splitter configured to connect the output of the primary laser to each of the secondary lasers.

Further, in an embodiment the secondary lasers are fixed polarisation lasers. However, it is possible to use lasers without a fixed polarisation output state and achieve similar results using a polariser after the non-fixed polarisation laser. The polarisation controller allows the polarisation of pulses output from one laser to be rotated with the respect to the pulses output by the other lasers. The polarisation controller may be selected from a wave-plate, a polarisation maintaining optical fibre or even a mount holding one or more of the secondary lasers such that the polarisation axis of the secondary lasers are rotated with respect to each other. The secondary lasers themselves may be positioned or rotated to allow the desired differences in the polarisation output by the emitter.

The above embodiments provide an emitter which emits a source of optical pulses with adjustable polarisation. The source of optical pulses with adjustable polarisation, can be generated without an active optical modulator and with identical wavelength for all pulses.

A source of optical pulses with adjustable polarisation comprising multiple multiplexed laser sources with distinct polarisation states which are selectively excited to generate light pulses; where these lasers are injection-locked to a common primary light source which defines a common wavelength.

In an embodiment, the optical emitter comprises four secondary lasers and wherein the emitter is configured such that the output from each secondary laser when received at the combination unit is in one of four polarisation states, wherein the four polarisation states are two orthogonal states that form a first polarisation basis and two orthogonal states that form a second polarisation basis which is different to the first polarisation basis. The above emitter can be used for quantum communication. The emitter will further comprise an attenuator configured to attenuate the pulses leaving the emitter to comprise on average no more than one photon.

The emitter can be used in a quantum communication system and can be implemented using discrete fibre optics, free-space optics or even an on-chip arrangement.

In an embodiment, a quantum communication system is provided comprising the above emitter, and a receiver, said receiver being configured to receive pulses from said emitter and measure said pulses in a first or a second polarisation basis.

The receiver may be configured to passively or actively select the polarisation basis. For example, in passive selection there is no control of moving parts in selecting the basis. The selection may be provided by a beam splitter that will randomly direct a single photon either towards a first measurement system which is configured to measure in a first basis or a second measurement system which is configured to measure in a second basis. Each measurement system may comprises a polarising beam splitter and a detector configured to measure the output of said polarising beam splitter for a polarisation basis.

In a further embodiment, a method of emitting an optical signal with varying polarisation states is provided, the method comprising:
emitting an optical signal from a primary laser;
receiving said optical signal from said primary laser at a plurality of secondary lasers such that the optical signal from said primary laser optically injection locks said plurality of secondary lasers; and
combining the outputs of the secondary lasers into an output signal,
wherein the output of at least one of the secondary lasers is rotated in polarisation with respect to the output of at least one other secondary lasers prior to combing.

In a further embodiment, a quantum communication method is provided, the method comprising:
emitting an optical signal with varying polarisation states according to the above method, wherein the polarisation states are randomly selected from two polarisation basis; and
receiving at a receiver the optical signal with varying polarisation states and varying the polarisation measurement basis in the receiver.

The above has may uses, the generation of optical pulses with encoded information at high clock rates is a key building block for optical communications. The state of polarisation of light is one of the most common optical properties which can be modulated to encode information (e.g. polarisation shift keying). For practical communication system applications, optical transmitters should be simple, compact, low cost, and have low power consumption. The above embodiment simplifies the state of the art in this area and thus could be used in numerous communication areas.

Also, polarisation-modulated laser sources are required for various sensing and imaging applications, where a sample's response to light is measured as a function of polarisation in order to infer information about its structure or properties (e.g. polarization modulation-infrared reflection-absorption spectroscopy, PM-IRRAS).

The above emitters can be used in many QKD systems. For example, the above can be used in polarisation-encoding quantum key distribution (QKD) and polarisation-encoding measurement device independent quantum key distribution (MDI QKD) devices. Polarisation encoding is particularly important for free-space QKD applications, such as Satellite QKD.

FIG. 1 is a schematic of an emitter in accordance with an embodiment. The emitter comprises a primary laser 101 which was sometimes be referred to as a "master laser". The primary laser 101 outputs a polarised beam to optical power splitter 103 in this embodiment, optical power splitter 103 splits the incoming radiation from primary laser 101 into 4 separate output channels. Each of the output channels are then directed into secondary lasers 105, 107, 109 and 111. The secondary lasers will sometimes be referred to as slave lasers.

Details on how the primary laser 101 outputs radiation and how this is used to seed the output of a secondary laser 105, 107, 109, 111 will be explained in detail with reference to FIGS. 2 and 3. In this embodiment, the primary laser is a pulsed laser and outputs pulsed radiation. Using a pulsed laser will allow phase randomisation between pulses which is useful for the security for some QKD protocols. However, some protocols do not require phase randomisation between pulses and can also be implemented using a continuous wave (CW) laser. Thus, in other embodiments, the primary laser may be a CW laser.

The first channel 113 from optical power splitter 103 leads to first secondary laser 105. In this particular example, the primary laser 101 outputs radiation with which is horizontally polarised. The polarisation of the primary laser is preserved as it passes through the optical power splitter 103 and is directed towards the lasers. The seeding of the primary laser pulse into first secondary laser 105 results in the first secondary laser outputting pulses along output channel 131 which are horizontally polarised radiation.

The second channel 115 from the optical power splitter 103 directs pulses from the primary laser 101 to second secondary laser 107. The second secondary laser 107 receives horizontally polarised pulse from the primary laser 101 via the optical power splitter 103 and second channel 115. The second secondary laser 107 then outputs a horizontally polarised pulse in response to receiving the pulse from the primary laser which seeds the second secondary laser 107. The output of the second secondary laser 107 is then passed through polarisation controller 121. In this embodiment, polarisation controller 121 is a half-wave plate at an angle of 22.5° angle. This results in converting horizontally polarised pulses into diagonally polarised pulses and outputting them along second output channel 133.

The third channel 117 from the optical power splitter 103 directs pulses from the primary laser 101 to third secondary laser 109. The third secondary laser 109 receives horizontally polarised pulse from the primary laser 101 via the optical power splitter 103 and third channel 117. The third secondary laser 109 then outputs a horizontally polarised pulse in response to receiving the pulse from the primary laser which seeds the third secondary laser 109. The output of the third secondary laser 109 is then passed through polarisation controller 123. In this embodiment, polarisation controller 123 is a half-wave plate at an angle of 45°. This results in converting horizontally polarised pulses into vertically polarised pulses and outputting them along third output channel 135.

The fourth channel 119 from the optical power splitter 103 directs pulses from the primary laser 101 to fourth secondary laser 111. The fourth secondary laser 111 receives horizontally polarised pulse from the primary laser 101 via the optical power splitter 103 and fourth channel 119. The fourth secondary laser 111 then outputs a horizontally polarised pulse in response to receiving the pulse from the primary laser which seeds the fourth secondary laser 111. The output of the fourth secondary laser 111 is then passed along fourth output channel 137 and through polarisation controller 125. In this embodiment, polarisation controller 125 is a half-wave plate at an angle of 67.5°. This results in converting horizontally polarised pulses into anti-diagonally polarised pulses and outputting them along fourth output channel 137. The anti-diagonally polarised pulses are orthogonal to the diagonally polarised pulses produced by polarisation controller 125.

The first output channel 131, the second output channel 133, the third output channel 135 and the fourth output channel 137 deliver the output pulses from the first to fourth secondary lasers, 105, 107, 109 and 111 to combination optics 139.

The combination optics 139 then combines the polarised pulses from the four output channels and outputs a stream of pulses where each pulse of the stream of pulses comes from one of the four output channels.

The first to fourth input channels 113, 115, 117 and 119 and the first to fourth output channels 131, 133, 135 and 137 may be provided by free space optics, optical fibres or a mixture of free space optics and optical fibres.

The optical power splitter 103 may be provided by a 1-to-4 optical power divider, or may comprise multiple cascaded beamsplitters to divide the input light into 4 equal inputs for the four input channels 113, 115, 117 and 119, with the polarisation state being unaffected and equal for each output.

The polarisation combiner 139 is configured to combine the pulses from the four output channels 131, 133, 135 and 137 into a single spatial mode. This may be achieved using passive components, for example, cascaded beamsplitters.

In the four output channels, 131, 133, 135 and 137, polarisation controllers 121, 123 and 125 are provided in the form of half-wave plates. However, in an all-fibre configuration, the polarisation controllers 121, 123 and 125 may be provided by polarisation-maintaining fibres in place of wave plates, where the linear polarisation state is related to the orientation of the birefringent axes of the polarisation-maintaining fibre. In FIG. 1, a polarisation controller is provided in the second to fourth output channels. However, polarisation controllers may be provided in all output channels to obtain the required polarisations for combination at the combination optics 139. The required polarisations will be set by the intended use of the emitter. For quantum communication, typically, the emitter will be required to emit a sequence of pulses having polarisations selected from one or more orthogonal basis.

FIG. 1 shows a primary laser 101 outputting to four secondary lasers 105, 107, 109, 111 via a power coupler 103. To explain the process of the seeding of the secondary lasers via the primary laser 101, an explanation will be provided for just a single primary laser 101 and a single secondary laser 103. However, it will be appreciated that in embodiments, one primary laser will seed a plurality of secondary lasers.

Figure 2:
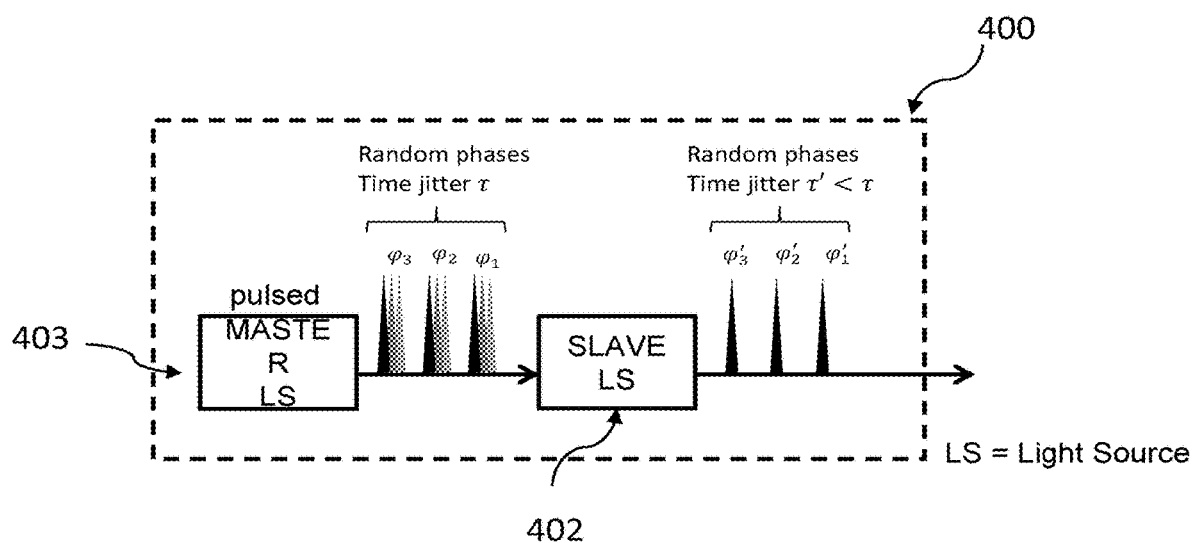
FIG. 2 is a schematic of a primary and secondary laser arrangement.

In the simplified arrangement of FIG. 2, primary laser 403 generates a sequence of light pulses which are referred to as primary light pulses. The phase of each primary light pulse has a random relationship to the phase of each subsequently generated primary light pulse. In FIG. 2, the primary laser 403 produces a train of pulses with random electromagnetic phases $\varphi_1$, $\varphi_2$, $\varphi_3$, . . . , and a large time jitter $\tau$ represented by the triplets of pulses. The triplets of pulses represent that fact that the light pulse could have been emitted at the time of the first, second, or third triplet pulse, and it is not known at which time it is emitted. The primary pulses are then injected as "seeds" into the secondary laser 402, leading to pulsed injection seeding. The presence of the primary light pulse in the cavity of the secondary light source means that the secondary light pulse is started by stimulated emission and not by spontaneous emission.

In other words, the primary light pulses are emitted from the primary laser 403 and enter secondary laser 402 through the first aperture. Light from primary laser 403 enters the optical cavity of the secondary laser 402 and causes pulsed injection seeding of the secondary laser 402. The term pulsed injection seeding can refer to laser seeding, or seeding by a light source other than a laser. Secondary light pulses are generated through pulsed injection seeding and are emitted from a second aperture of the secondary light source 402.

In this embodiment, the primary laser 403 is configured output light pulses that have a random phase relationship with each other this means that each secondary light pulse will also have a random phase with respect to each subsequently generated secondary light pulse. Pulsed injection seeding occurs each time the secondary laser 402 is switched above the lasing threshold. In this case, the generated secondary light pulse has a fixed phase relation to the injected primary light pulse. As only one secondary light pulse is generated for each injected primary light pulse, each secondary light pulse has a random phase relationship to each subsequently generated secondary light pulse (because each primary light pulse has a random phase relationship to each subsequently generated primary light pulse).

Under the operating conditions that will be described below in relation to FIG. 3, the secondary laser 402 generates a new train of pulses, which still exhibit random electromagnetic phases $\varphi_1'$, $\varphi_2'$, $\varphi_3'$. These pulses will also have a smaller time jitter $\tau' < \tau$ to the pulses outputted by the primary laser 403. The reduced jitter time this improves interference visibility due to the low time jitter of the secondary light pulses. The reduced jitter reduces detection noise (as quantified by the quantum bit error rate) too since the uncertainty in arrival time is reduced.

Also, the phase of each secondary laser is random—i.e. each pulse that's outputted from the emitter has a random phase. As this embodiment may be used for "polarisation-encoded" QKD, the actual value of the phase is, is unimportant. Therefore, it doesn't matter whether the secondary lasers produce pulses with a phase offset between them (e.g. due to slightly different length paths), since only one pulse from the four "branches" is taken as the output for each bit and as long as all four branches have a random phase, then this is fine.

To achieve phase randomisation, the electrical driving signal that's applied to the primary laser is tailored, for example to allow time between excitations for the carriers in the primary laser cavity to empty, so the next pulse is seeded by spontaneous emission, not residual excitation. The secondary lasers are then locked by the primary and acquire a fixed phase offset to the primary (this is the nature of optical injection locking). As long as the phase of the primary is random, then any fixed offset from this is random too.

In order for injection locking to occur, the free-running secondary laser frequency 402 (as set by the laser cavity material/geometry) should be within a certain range of the primary light frequency.

This is the condition for injection locking to occur. When the condition is met, the secondary laser frequency changes to equal that of the primary (so the primary & secondary emission is the exact same frequency).

If the condition is not met—i.e. the primary & secondary lasers are too different to begin with, then injection locking will be unsuccessful and they will lase at different frequencies which will allow an eavesdropper to determine the state from the frequency and hence obtain "side channel" information. In one embodiment, the difference in the frequency of the light supplied by the primary laser 403 and the frequency of the secondary laser 402 is less than 30 GHz. In some embodiments, where the secondary laser 402 is a distributed feedback (DFB) laser diode the frequency difference is less than 100 GHz.

For successful pulsed injection seeding the relative power of the primary light pulses that enter the optical cavity of the secondary laser 402 has to be within certain limits which depend on the type of light source that is used. In one embodiment, the optical power of the injected primary light pulses is at least 1000 times lower than the optical output power of the secondary laser 402. In one embodiment, the optical power of the injected primary light pulses is at least 100 times lower than the optical output power of the secondary laser 402.

In one embodiment, secondary laser 402 and primary laser 403 are electrically driven, gain-switched semiconductor laser diodes. In one embodiment, the secondary light source and primary light source have the same bandwidth. In one embodiment, both light sources have a bandwidth of 10 GHz. In one embodiment, both light sources have a bandwidth of 2.5 GHz. Here, the bandwidth means the highest bit rate achievable with the gain-switched laser diode under direct modulation. A laser of a certain bandwidth can be operated at a lower clock rate.

Figure 3A:
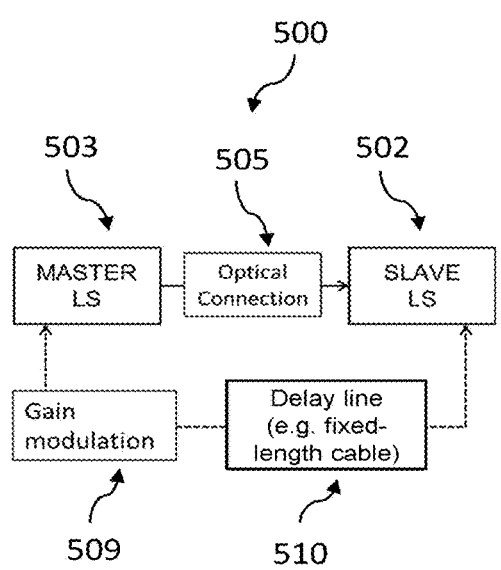
FIG. 3A is a schematic of a gain modulation circuit for driving a primary laser and a secondary laser and FIG. 3B is a series of five time dependent plots which are, in order from the upper most plot: modulation of primary laser; carrier density of primary laser; output of primary laser; modulation of secondary laser; and output of secondary laser.

FIG. 3A is a schematic illustration of a driving scheme for the phase-randomised light source 500 for which both the primary laser 503 and the secondary laser 502 are driven with a single gain modulation unit 509. The gain modulation unit 509 and delay line 510 are an example of a controller which is configured to apply a time varying drive signal to the secondary laser 502 such that just one light pulse is generated during each period of time for which a primary light pulse is received. The primary laser 503 is connected to the secondary laser 502 via an optical connection 505. The optical connection 505 could be a waveguide, for example an optical fibre (as shown in FIG. 2). Alternatively, the light pulses may travel between the primary laser 503 and the secondary laser 502 through free space. The optical connection may include further components such as an optical circulator, an optical isolator (that prevents backreflections going into the primary laser which could disturb the primary laser) or a beam splitter.

A gain modulation unit 509 drives both the primary laser 503 and the secondary laser 502 to generate pulses of light. The delay line 510 is used to synchronise the apparatus. The delay line may be, for example, a fixed length cable. The gain modulation unit is directly connected to the primary laser 503. For example, where the primary laser 503 is a semiconductor laser, a gain modulation circuit is electrically connected to the primary laser 503. The gain modulation unit 509 is connected to the secondary laser 502 through delay line 510.

Figure 3B:
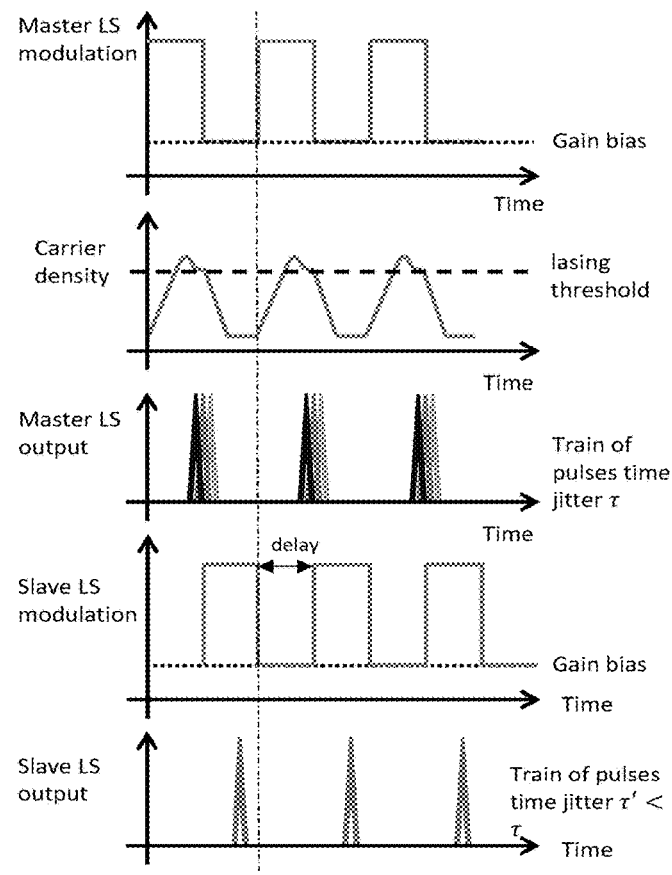

FIG. 3B shows a temporal sequence for the single gain modulation scheme shown in FIG. 3A. The upper graph shows the gain modulation applied to the primary light source 503. The current applied to the laser is shown on the vertical axis, with time on the horizontal axis. The gain modulation is a time varying drive signal, having the form of a square wave, which when applied to the primary light source, increases the carrier density above and below the lasing threshold. In other words, the gain modulation is a series of pulses. In between the pulses, the gain has a minimum value, which is the gain bias and is indicated by the dotted line. The wave in this case is a square-type waveform. A different gain modulation signal can be used, for example a sine wave, or a non-periodic time varying signal. In this case, the current is not reduced to zero in between the current modulation pulses, but only reduced to a bias value (which is indicated by the dotted line).

The current modulation signal is applied to the laser and switches the gain of the laser above and below the lasing threshold periodically. The second graph shows the carrier density of the laser on the vertical axis, against time on the horizontal axis. The lasing threshold is indicated by a dashed horizontal line. When a current modulation pulse is applied to the laser, the injected carriers increase the carrier density and the photon density increases.

The laser output generated by the modulation signal is shown in the lower graph. The vertical axis shows the laser intensity, with time on the horizontal axis. The laser outputs light when the carrier density is above the lasing threshold. Photons generated by spontaneous emission inside the laser cavity are amplified sufficiently by stimulated emission to generate an output signal. The length of the delay between the application of the current modulation pulse and the generation of the output light depends on several parameters, such as the laser type, cavity length and pumping power.

The rapid increase of the photon density causes a decrease in the carrier density. This in turn decreases the photon density, which increases the carrier density. At this point the current modulation pulse is timed to switch back down to the DC bias level, and the laser emission dies off quickly. The laser output therefore consists of a train of short laser pulses as shown in the lower graph.

To generate longer pulses, the gain bias is chosen to be closer to the lasing threshold. This means that the carrier density crosses the lasing threshold earlier, which gives the light pulse more time to evolve. Initially the light intensity will overshoot and quickly reduce the carrier density. This in turn causes the photon density to decrease and the carrier density to increase, in turn increasing the light intensity. This competing process causes oscillations of the light intensity at the beginning of the pulse which are strongly damped, leading quickly to a steady-state where the intensity is constant. The oscillations are called relaxation oscillations. The laser pulse ends when the current pulse ends and switches the current to the bias value again.

The next graph shows the output of the primary laser 503. One light pulse is outputted each time the carrier density increases above the lasing threshold. As explained above, there can be a delay between when the gain increases and when a light pulse is outputted. The primary light pulses have a large time jitter τ.

The next graph shows the gain modulation applied to the secondary light source 502. The gain modulation is the same as that applied to the primary light source 503, with the addition of the time delay labelled by an arrow. The gain modulation is a time varying drive signal applied to the secondary light source. In other words, the gain modulation applied to the secondary laser 502 is shifted in time with respect to the gain modulation applied to the primary laser 503. Each periodic increase in gain is applied to the secondary light source 502 later than it is applied to the primary laser 503. The delay in this case is around half a period of the gain modulation signal. The delay means that the periodic increase in gain is applied to the secondary laser 502 after the primary light pulse has been injected. Therefore the primary light pulse is present in the secondary laser cavity when the gain increase is applied, and the resulting secondary light pulse is generated by stimulated emission from the primary light pulse. This means that the generated secondary light pulse has a fixed phase relation to the injected primary light pulse.

The secondary laser 502 is switched above the lasing threshold after the primary light pulse has been injected such that a secondary light pulse is initiated by stimulated emission caused by the injected primary light pulse. The timing of the onset of the gain bias of the secondary laser 502 is controlled via the delay line 510. The final graph shows the output of the secondary light source 502. Only one secondary light pulse is outputted each time the carrier density increases above the lasing threshold. Again, there can be a delay between the increase in gain modulation and the outputted light pulse. The time jitter of the outputted secondary light pulses is lower than that of the jitter of the primary light pulses.

In the system shown in FIG. 3, gain modulation unit 509 applies a time varying gain modulation to the secondary light source 502 such that it is switched above the lasing threshold only once during the time that each primary light pulse is incident. The switching of the secondary light source 502 is synchronised with the arrival of the primary light pulses because the same gain modulation signal is applied to both light sources, and a delay line delays the application of the increase in gain to the secondary light source 502 with respect to the primary light source 503.

In the system shown in FIG. 3(b), the time varying gain modulation signal has a square type wave form. However, the time varying gain modulation can comprise signals with arbitrary pulse shape.

Where the light sources are gain-switched semiconductor lasers, the gain modulation signal is an applied current or voltage. In one embodiment, the gain modulation signal is an applied current or voltage with a square type wave form. In an alternative embodiment, the time varying current or voltage is an electrical sine wave generated by a frequency synthesizer. In one embodiment, the frequency of the gain modulation signal is less than or equal to 4 GHz. In one embodiment, the frequency is 2.5 GHz. In one embodiment, the frequency is 2 GHz.

A gain-switched semiconductor laser has a good extinction ratio between the state when pulses are emitted and the "off" state. It can be used to generate very short pulses. In one embodiment, the duration of each of the secondary light pulses is less than 200 ps. In one embodiment, the duration of each of the secondary light pulses is less than 50 ps. In one embodiment, the duration of each of the secondary light pulses is of the order of a few picoseconds. In one embodiment, where the time varying current or voltage is a square wave current or voltage with a frequency of 2 GHz, the short light pulses are 500 ps apart.

In the light source shown in these figures, the primary light source and the secondary light source share the same electrical driver for gain modulation. However, the primary light source and the secondary light source could also be driven by separate gain modulation units 509. By driving the gain modulation by separate units, it is possible to generate longer primary light pulses than those generated in FIG. 3(b), the gain bias value is closer to the lasing threshold. This means that the carrier density crosses the lasing threshold earlier, which gives the light pulse more time to evolve. This can also be used to reduce jitter.

In this embodiment, the phase of pulse outputted by each secondary laser is random. To achieve phase randomisation, the electrical driving signal that is applied to the primary laser is configured to allow time between excitations for the carriers in the primary laser cavity to empty, so the next pulse is seeded by spontaneous emission, not residual excitation. The secondary lasers are then locked by the primary and acquire a fixed phase offset to the primary (this is the nature of optical injection locking). As long as the primary laser output has a random phase, then any fixed offset from this is random too.

Figure 4:
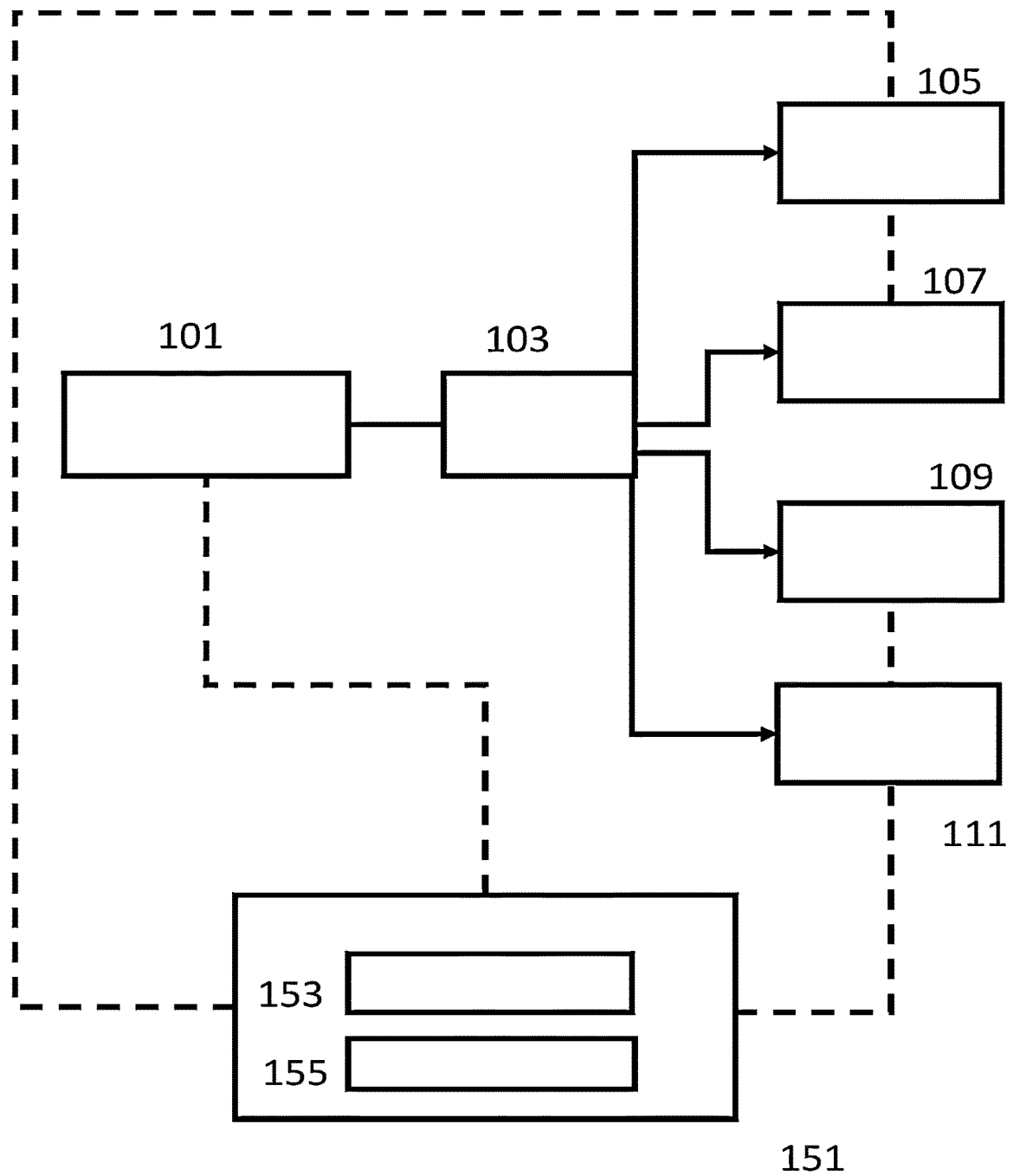
FIG. 4 is a schematic of a controller for the emitter of FIG. 1.

FIG. 4 shows part of the emitter of FIG. 1 which will be used to explain the control of the secondary lasers 105, 107, 109 and 111 by control unit 151. In FIG. 4, the open channels 131, 133, 135, 137, the polarisation controllers 121, 123 and 125 and the polarisation combining optics 139 have been omitted for clarity. To avoid any unnecessary repetition, like reference numerals will be used to denote like features.

In FIG. 4, a single control unit 151 is shown which controls both the primary laser and the four secondary lasers. However, it is possible to have separate control units for the primary laser and a separate controller unit for the force secondary lasers or even to have separate gain control units for each of the secondary lasers.

As will be explained in relation to a specific embodiment, coordination between the control of the different lasers is required even if they are controlled by separate units. In the arrangement shown in FIG. 4, the control unit 151 comprises a gain control module which is used to control the gain of the primary laser 101 and each of the secondary lasers 105, 107, 109 and 111.

The gain control unit 151 is configured to cause primary laser 101 to output a primary pulse by increasing the gain of the primary laser 101 above its lasing threshold. In this embodiment, the control unit 151 also comprises a selection module 153 which is configured to determine which of the secondary lasers 105, 107, 109 and 111 to select for outputting a pulse. The selection module 153 may be configured to randomly select a secondary laser to output the next pulse. The selection module 153 selects the secondary laser 105, 107, 109 and 111 to output the next pulse and the gain control module 151 provides an instruction to the selected secondary laser to increase its gain above the lasing threshold. The timing of the increase in the gain of the selected secondary laser is coordinated with the increase in the gain of the primary laser 101 in the manner described with reference to FIG. 3.

By controlling the gain on the primary laser 101, the primary laser outputs a sequence of primary pulses which are then directed by power splitter 103 to each of the 4 secondary lasers 105, 107, 109 and 111. However, only a secondary laser that has been selected by the control unit 151 will output a pulse in response to receiving a seeding pulse from the primary laser. This is because, in this embodiment, only the gain of one of the secondary lasers will be raised above its lasing threshold as or shortly after it receives the pulse from the primary laser 101 in accordance with conditions described with reference to FIG. 3. By selecting between the secondary lasers for each pulse received from the primary laser, it is possible to output a sequence of pulses with varying polarisations.

This embodiment uses optical injection locking. In the above embodiment, all secondary lasers are seeded and thus, injection locked by light from a common, primary laser.

As the secondary lasers are injection locked to the primary laser, this causes the secondary laser emission phase to have a fixed relationship to the phase of the pulses output from the primary laser. As described above, the phase of the pulses output by the primary laser will be random. Importantly, the secondary laser wavelengths will then be defined by the injected wavelength and not its own free-running wavelength. Thus, the wavelength output by each secondary laser will be identical.

By splitting the power from a primary laser to injection-lock all the fixed-polarisation secondary lasers in the multiplexed array, this ensures the wavelengths of all possible laser outputs are identical. This removes the side-channel from the transmitter meaning an eavesdropper can no longer identify which laser was used to generate each pulse by measuring the wavelength In the above embodiment, the primary 101 and secondary 105, 107, 109, 111 lasers are gain switched by an electronic driving signal at the same frequency, which can be in excess of 1 GHz. The signals are temporally aligned as explained with reference to FIG. 3 so that the primary pulse arrives at the secondary laser during the time the secondary laser's electrical signal is applied. To generate a pulse with a user-chosen polarisation, the user pulses the primary laser and selectively pulses one of the secondary lasers. During this time, the three other secondary lasers which are not chosen do not receive an electrical signal and are held below the laser threshold, preventing light emission.

Other variations on the emitter are possible, for example, in the above example, a secondary laser is selected and the combining optics 139 are passive. However, it is possible for all secondary lasers to be activated to output a secondary pulse and then for the combining optics 139 to perform the selection of which pulse to output the sequence of output pulses.

Figure 5:
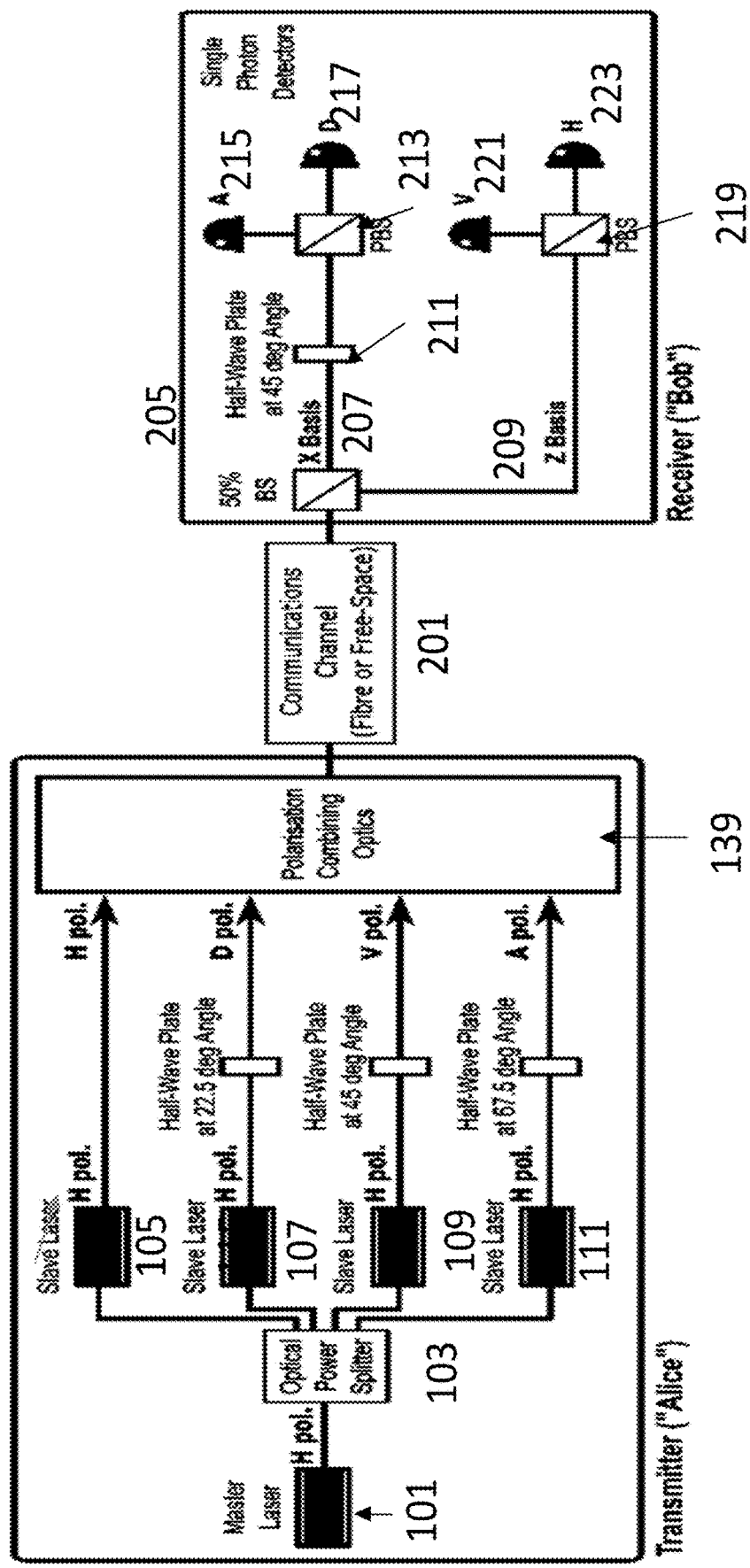
FIG. 5 is a schematic of a quantum communication system in accordance with an embodiment.

The above emitter is particularly suited to use in quantum cryptography. FIG. 5 is an example of a quantum cryptography system using the emitter of FIG. 1. As explained above, the emitter is configured to output a plurality of pulses which have varying polarisations.

The electric field of light can be described as two perpendicular oscillating waves, which can have different amplitudes and a phase delay between them. These waves propagate together, defining the overall direction of the electric field—known as the state of polarisation of light.

Information can be encoded by modulating the optical polarisation state and for practical applications, it is common to choose states from the following polarisation bases which comprise two orthogonal basis states:

Rectilinear Linear Polarisation—with basis states H (horizontal polarisation, i.e. 0 deg angle of orientation) and V (vertical polarisation, i.e. 90 deg angle of orientation)

Diagonal Linear Polarisation—with basis states D (diagonal polarisation, i.e. 45 deg angle of orientation, which is equivalent to considering light as comprising 50% of light in horizontal and 50% in the vertical direction, with 0 phase delay between them) and A (anti-diagonal polarisation, i.e. −45 deg angle of orientation, which is equivalent to considering light as comprising 50% of light in horizontal and 50% in the vertical direction, with π phase delay between them)

Circular Polarisation—with basis states L (left circular polarized, i.e. 45 deg angle of orientation, which is equivalent to considering light as comprising 50% of light in horizontal and 50% in the vertical direction, with π/2 phase delay between them) and R (right circular polarized, i.e. 45 deg angle of orientation, which is equivalent to considering light as comprising 50% of light in horizontal and 50% in the vertical direction, with −π/2 phase delay between them)

These polarisation basis states expressed as Jones vectors are:

$$H = \begin{pmatrix} 1 \\ 0 \end{pmatrix} \quad V = \begin{pmatrix} 0 \\ 1 \end{pmatrix}$$

$$D = \frac{1}{\sqrt{2}} \begin{pmatrix} 1 \\ 1 \end{pmatrix} \quad A = \frac{1}{\sqrt{2}} \begin{pmatrix} 1 \\ -1 \end{pmatrix}$$

$$L = \frac{1}{\sqrt{2}} \begin{pmatrix} 1 \\ i \end{pmatrix} \quad R = \begin{pmatrix} 1 \\ -i \end{pmatrix}$$

where $i=\sqrt{-1}$.

A basic quantum communication protocol which uses polarisation will now be explained. However, it should be noted that this is not meant as limiting and other polarisation based protocols could also be used.

The protocol uses two basis wherein each basis is described by two orthogonal states. For this example the basis of H/V and D/A. However, the L/R basis could also be selected.

The sender in the protocol prepares states with one of H, V, D or A polarisation. In other words, the prepared states are selected from two orthogonal states (H and V or D and A) in one of two basis H/V and D/A. This can be thought of as sending a signal of 0 and 1 in one of two basis, for example H=0, V=1 in the H/V basis and D=0, A=1 in the D/A basis. The pulses are attenuated so that they comprise on average, one photon or less. Thus, if a measurement is made on the pulse, the pulse is destroyed. Also, it is not possible to split the pulse.

The receiver uses a measurement basis for the polarisation of a pulse selected from the H/V basis or the D/A basis. The selection of the measurement basis can be active or passive. In passive selection the basis is selected using fixed components, such as the beam splitter as shown in FIG. 5. In "active" basis choice, the receiver makes a decision which basis to measure in—e.g. using a modulator with an electrical control signal. If the basis used to measure the pulse at the receiver is the same as the basis used to encode the pulse, then the receiver's measurement of the pulse is accurate. However, if the receiver selects the other basis to measure the pulse, then there will be a 50% error in the result measured by the receiver.

To establish a key, the sender and receiver compare the basis that were used to encoder and measure (decode). If they match, the results are kept, if they do not match the results are discarded. The above method is very secure. If an eavesdropped intercepts the pulses and measures then, the eavesdropper must prepare another pulse to send to the receiver. However, the eavesdropper will not know the correct measurement basis and will therefore only has a 50% chance of correct measuring a pulse. Any pulse recreated by the eavesdropper will cause a larger error rate to the receiver which can be used to evidence the presence of an eavesdropper. The sender and receiver compare a small part of the key to determine the error rate and hence the presence of an eavesdropper.

FIG. 5 shows a quantum communication system in accordance with an embodiment.

The transmitter is the same as the emitter described with reference to FIG. 1. To avoid any unnecessary repetition, like reference numerals are used to denote like features. The sequence of output pulses from the transmitter is then passed through free space or via an optical fibre 201 to receiver 203. A simplified form of the receiver is shown. The receiver comprises a 50-50 beam splitter 205 which will direct the incoming pulse either along first measurement channel 207 or a second measurement channel 209. Since the pulses contain on average less than one photon, the 50-50 beam splitter 205 will direct the pulse randomly along one of the first measurement channel or the second measurement channel. This has the result of selecting a measurement basis to be the X (D/A) basis or the Z (H/V) basis. The non-polarising beam splitter 205 functions to allow random selection of one of the two bases.

The first measurement channel is for the X basis which corresponds to the D/A bases. Here, a half wave plate 211 is provided to rotate the polarisation by 45 degrees between the two detection branches, i.e. giving the 2 measurement bases X and Z. The output of the half wave plate 211 is then directed towards polarising beam splitter 213. Polarising beam splitter 213 directs pulses with anti-diagonal polarisation towards anti-diagonal detector 215 and pulses with a diagonal polarisation towards diagonal detector 217. Detectors 215 and 217 are single photon detectors, for example avalanche photodiodes.

Pulses directed along the second measurement channel are measured in the Z basis to determine if they are horizontal or vertical. Here, the pulses directed into the second measurement channel are directed toward polarising beam splitter 219 which directs vertically polarised pulses towards detector 221 and horizontally polarised pulses towards detector 223. Again, detectors 221 and 223 are single photon detectors.

If a photon is received which is polarised in the D/A bases and this is randomly sent to be measured in the Z bases along the second management channel 209, one of detectors 221, 223 are likely to register a count. However, this result cannot be trusted as a photon received at polarising beam splitter 219 has a 50-50 chance of being directed towards either the vertical or the horizontal detector.

In the above embodiments, the optical injection locking technique brings numerous advantages compared to using multiplexed free-running independent pulsed lasers. Injection locking means the pulsed secondary lasers are seeded by the injected light, rather than by vacuum fluctuations, which significantly reduces the temporal jitter of their output and increases the maximum possible modulation bandwidth (beyond that which is possible in free-running operation). This enables the transmitter to operate at higher clock rates, leading to higher bit rates in a communication system application. The chirp of generated pulses and relative intensity noise is also reduced, leading to improved performance.

The above embodiments that use optical injection locking in multiplexed laser source designs, result in low-cost, compact, robust light sources capable of operating as high-speed (>GHz) polarisation-encoding communications transmitters.

Although the above has referred to quantum communication as an example, the emitter also has applications in other areas. Polarisation-modulated laser sources are required for various sensing and imaging applications, where a sample's response to light is measured as a function of polarisation in order to infer information about its structure or properties (e.g. polarization modulation-infrared reflection-absorption spectroscopy, PM-IRRAS).

In the above system, the wavelength of each of the pulses with different polarisations are identical since they all come from the same primary laser and hence an eavesdropper is not able to obtain any "side channel" information due to differences in the wavelength of the pulses.

Further, the above QKD system does not need to use phase modulators which add significant cost, complexity and size to polarisation modulated transmitters. $LiNbO_3$ modulators are also not readily adaptable to an integrated photonics platform, which prevents many QKD transmitter designs being developed into small photonic chip-based designs. Also, birefringence of the phase modulator crystals can induce polarisation mode dispersion, which must be compensated by additional components, adding further complexity and cost. Phase modulators typically have half-wave voltages of a few volts. To obtain a $\pi$ phase shift between the polarisation modes when used in non-interferometer arrangement even higher voltages are required. Such high voltages can be impractical to generate and increase power consumption of the overall communications transmitter.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. An optical emitter comprising:
 a primary laser and a plurality of secondary lasers wherein each secondary laser is optically injection locked to said primary laser;
 at least one polarization controller configured to control the polarization of output of at least one of the secondary lasers;
 a combination unit that is configured to combine the outputs of the secondary lasers into an output signal; and
 an optical power splitter configured to connect output of the primary laser to each of the secondary lasers.

2. The optical emitter according to claim 1, wherein the primary laser and the secondary lasers are pulsed lasers configured to output optical pulses.

3. The optical emitter according to claim 2, further comprising a selection unit configured to select one of said plurality of secondary lasers to contribute to the output signal at a time such that the output signal comprises a sequence of pulses wherein the sequence randomly switches between the outputs of the secondary lasers such that the polarization of the pulses change for each pulse.

4. The optical emitter according to claim 3, wherein the primary laser and the plurality of secondary lasers are gain-switched lasers.

5. The optical emitter according to claim 4, wherein the primary laser is controlled to emit pulses with a random phase between the pulses.

6. The optical emitter according to claim 4, wherein the selection unit comprises a gain control unit that is configured to control the gain of the selected secondary laser to be above its lasing threshold.

7. The optical emitter according to claim 6, wherein the gain control unit is configured to hold the non-selected secondary lasers below their lasing threshold.

8. The optical emitter according to claim 6, wherein the gain control unit is configured to control the primary laser and the plurality of secondary lasers.

9. The optical emitter according to claim 8, wherein the gain control unit is configured to increase the gain of a selected second secondary laser above its lasing threshold as or just after it receives a pulse from the primary laser.

10. The optical emitter according to claim 2, further comprising an attenuator configured to attenuate the pulses output by the optical emitter such that they, on average, contain less than one photon.

11. The optical emitter according to claim 1, wherein the secondary lasers are fixed polarization lasers.

12. The optical emitter according to claim 1, wherein the polarization controller is selected from a wave-plate, a polarization maintaining optical fibre or a mount configured to mount one of the secondary lasers such that its polarization axis is rotated with respect to at least one other secondary laser.

13. The optical emitter according to claim 1, wherein the optical emitter is configured to output polarization pulses where the polarization is randomly selected from two polarization basis.

14. The optical emitter according to claim 13, comprising four secondary lasers and wherein the optical emitter is configured such that the output from each secondary laser when received at the combination unit is in one of four polarization states, wherein the four polarization states are two orthogonal states that form a first polarization basis and two orthogonal states that form a second polarization basis which is different to the first polarization basis.

15. A quantum communication system comprising the optical emitter according to claim 13, and a receiver, said receiver being configured to receive pulses from said emitter and measure said pulses in a first or a second polarization basis.

16. The quantum communication system according to claim 15, wherein the receiver is configured to passively select the polarization basis.

17. The quantum communication system according to claim 15, wherein the receiver comprises a polarization beam splitter and a detector configured to measure output of said polarization beam splitter for each polarization basis.

18. A method of emitting an optical signal with varying polarization states, the method comprising:
emitting an optical signal from a primary laser;
directing, by an optical power splitter, the optical signal from said primary laser to a plurality of secondary lasers such that the optical signal from said primary laser optically injection locks said plurality of secondary lasers; and
combining outputs of the secondary lasers into an output signal,
wherein the output of at least one of the secondary lasers is rotated in polarization with respect to the output of at least one other secondary lasers prior to combining.

19. A quantum communication method, the method comprising:
emitting an optical signal with varying polarization states according to the method of claim 18, wherein the polarization states are randomly selected from two polarization basis; and
receiving at a receiver the optical signal with varying polarization states and varying the polarization measurement basis in the receiver.

20. An optical emitter comprising:
a primary laser and a plurality of secondary lasers wherein each secondary laser is optically injection locked to said primary laser;
at least one polarization controller configured to control the polarization of output of at least one of the secondary lasers;
a combination unit that is configured to combine the outputs of the secondary lasers modules into an output signal;
wherein the primary laser and the secondary lasers are pulsed lasers configured to output optical pulses;
the optical emitter further comprising a selection unit configured to select one of said plurality of secondary lasers to contribute to the output signal at a time such that the output signal comprises a sequence of pulses wherein the sequence randomly switches between the outputs of the secondary lasers such that the polarization of the pulses change for each pulse;
wherein the primary laser and the plurality of secondary lasers are gain-switched lasers; and
wherein the primary laser is controlled to emit pulses with a random phase between the pulses.

21. A method of emitting an optical signal with varying polarization states, the method comprising:
emitting an optical signal from a gain-switched pulsed primary laser, wherein the gain-switched pulsed primary laser outputs optical pulses with a random phase between the optical pulses;
receiving said optical signal from said primary laser at a plurality of gain-switched pulsed secondary lasers such that the optical signal from said primary laser optically injection locks said plurality of secondary lasers;
emitting optical pulses from the secondary lasers;
combining outputs of the secondary lasers into an output signal,
wherein the output of at least one of the secondary lasers is rotated in polarization with respect to the output of at least one other secondary lasers prior to combining; and
selecting one of the plurality of secondary lasers to contribute to the output signal at a time such that the output signal comprises a sequence of pulses wherein the sequence randomly switches between the outputs of the secondary lasers such that the polarization of the pulses change for each pulse.

22. An optical emitter comprising:
a primary laser and a plurality of secondary lasers wherein each secondary laser is optically injection locked to said primary laser;
at least one polarization controller configured to control the polarization of output of at least one of the secondary lasers;
a combination unit that is configured to combine the outputs of the secondary lasers into an output signal;

wherein the primary laser and the secondary lasers are pulsed lasers configured to output optical pulses;

the optical emitter further comprising a selection unit configured to select one of said plurality of secondary lasers to contribute to the output signal at a time such that the output signal comprises a sequence of pulses wherein the sequence randomly switches between the outputs of the secondary lasers such that the polarization of the pulses change for each pulse;

wherein the primary laser and the plurality of secondary lasers are gain-switched lasers; and wherein the selection unit comprises a gain control unit that is configured to control the gain of the selected secondary laser to be above its lasing threshold.

23. A method of emitting an optical signal with varying polarization states, the method comprising:

emitting an optical signal from a gain-switched pulsed primary laser, wherein the gain-switched pulsed primary laser outputs optical pulses;

receiving said optical signal from said primary laser at a plurality of gain-switched pulsed secondary lasers such that the optical signal from said primary laser optically injection locks said plurality of secondary lasers;

emitting optical pulses from the secondary lasers;

combining outputs of the secondary lasers into an output signal, wherein the output of at least one of the secondary lasers is rotated in polarization with respect to the output of at least one other secondary lasers prior to combining;

selecting one of the plurality of secondary lasers to contribute to the output signal at a time such that the output signal comprises a sequence of pulses wherein the sequence randomly switches between the outputs of the secondary lasers such that the polarization of the pulses change for each pulse; and controlling the gain of the selected secondary laser to be above its lasing threshold.

* * * * *